United States Patent [19]
Park

[11] 4,099,279
[45] Jul. 11, 1978

[54] BOAT LAUNCHING AND RECOVERY GUIDE FOR BOAT TRAILERS

[76] Inventor: W. Sidney Park, 513 Morningside Dr., Louisville, Ky. 40206

[21] Appl. No.: 819,148

[22] Filed: Jul. 26, 1977

[51] Int. Cl.² ............................................. B60P 1/52
[52] U.S. Cl. .......................................... 9/1.2; 214/84; 280/414 R; 61/67
[58] Field of Search ...................... 214/505, 506, 84; 280/414 R; 9/1.2; 61/65, 67

[56] References Cited
U.S. PATENT DOCUMENTS

| | | | |
|---|---|---|---|
| 2,371,461 | 3/1945 | Newell | 9/1.2 X |
| 3,608,754 | 9/1971 | Park | 9/1.2 X |

*Primary Examiner*—Albert J. Makay
*Attorney, Agent, or Firm*—Birch, Stewart, Kolasch and Birch

[57] ABSTRACT

A boat launching and recovery guide structure is provided in which a pair of parallel guide rails are fixed by means of pivots to a rigid front bolster on the main frame of a boat trailer and extend backward to form sliding interconnections with a floating rear bolster mounted on a floating frame of the trailer, the floating frame being pivoted intermediate the front and rear extremities of the main frame and the sliding interconnections acting to compensate for the change in geometry caused by floation of the floating frame on the surface of the water into which a boat is being launched or from which it is being recovered. This structure provides strength and rigidity permitting a wide latitude of angles of entry into the trailer of a boat being recovered from the water.

10 Claims, 8 Drawing Figures

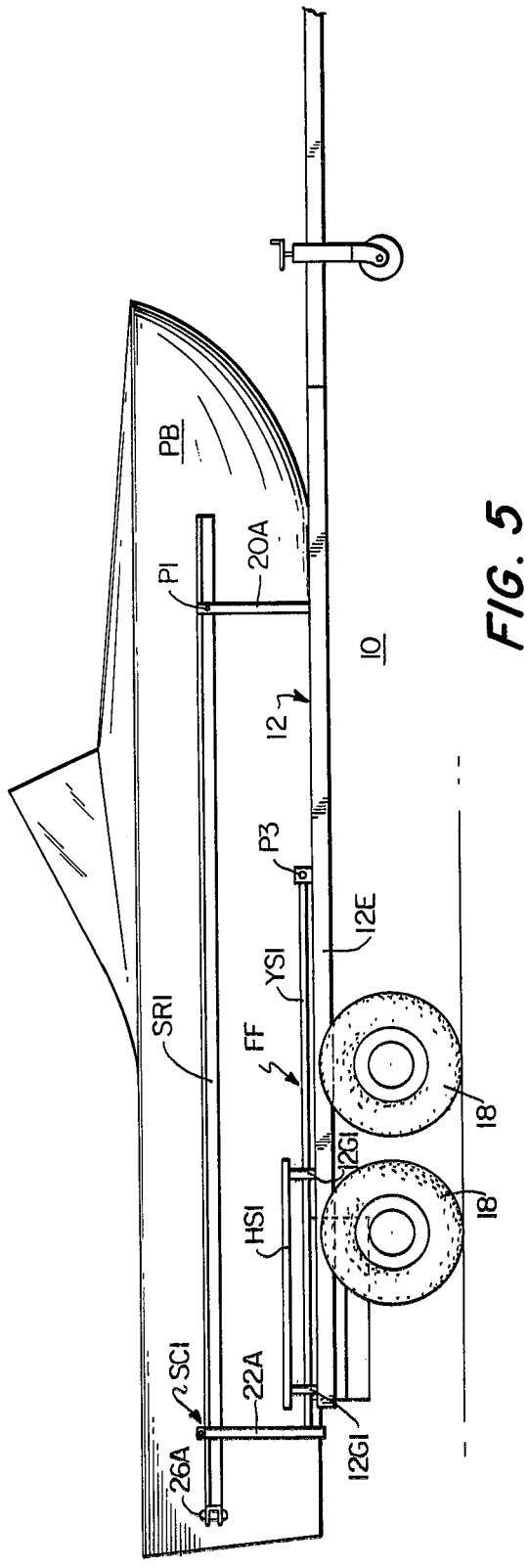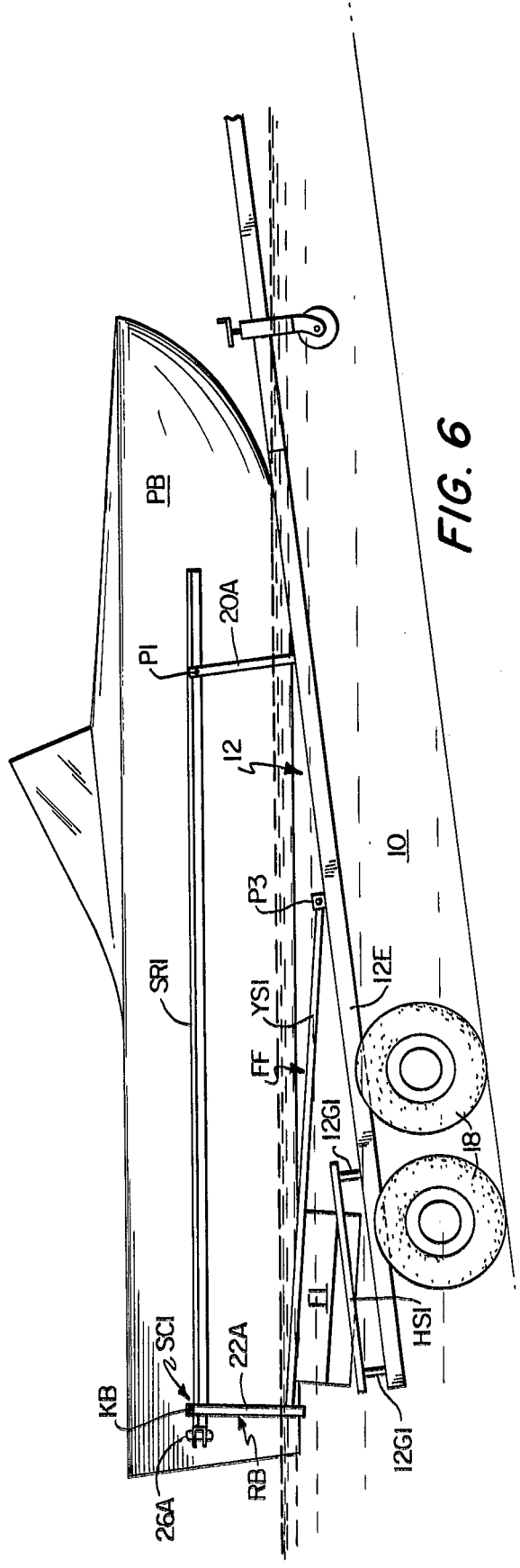

BOAT LAUNCHING AND RECOVERY GUIDE FOR BOAT TRAILERS

FIELD OF THE INVENTION

This invention relates to boat trailers and more particularly to a boat launching and recovery guide for same.

BACKGROUND OF THE INVENTION

One of the primary problems with recovering a boat from the water and placing it on a trailer is that the angle of entry of the boat with respect to the trailer becomes relatively critical. Recovery of the boat and a proper alignment thereof on the trailer is difficult to achieve unless the keel of the boat and the keel rollers along the central axis of the trailer are substantially in alignment prior to the engagement of the major portion of the keel with the rollers.

There is also a need in the art for boat launching and recovery guides for boat trailers which maintain such guides at a substantially predetermined level above and relatively parallel to the surface of the body of water into which or from which a boat is being launched or recovered.

Therefore, it is an object of the present invention to provide an improved boat launching and recovery guide structure for boat trailers.

Still another object of the present invention is to provide a new and novel boat launching and recovery guide for boat trailers which permits a wide latitude of angles of entry of a boat thereto during recovery of the boat from the water.

Yet another object of the present invention is to provide a boat launching and recovery guide structure for boat trailers which is relatively simple in construction and operation and which automatically aligns itself with the level of water into which or from which a boat is being launched or recovered.

These and other objects of the present invention will become more fully apparent with reference to the following specification considered with the accompanying drawings which relate to a preferred embodiment of the present invention.

BRIEF DESCRIPTION OF THE DRAWINGS

FIG. 5 is a schematic side plan view showing the boat launching and recovery linkage of the present invention with a boat in a fully recovered or trailer mounted position; and FIG. 6 is a schematic side plan view illustrating the recovery linkage of the present invention with a boat recovered therein but with the major portion of the trailer chassis beneath the water surface and the guide assembly of the present invention aligned with the water surface.

This is an improvement over prior U.S. Pat. No. 3,608,754 of W. Sidney Park, for Launching and Recovery Guide, issued Sept. 28, 1971 and the disclosure of the patent insofar as applicable is incorporated by reference herein.

SUMMARY OF THE INVENTION

The boat trailer and guide means of the present invention are comprised of a basically rectangular interior trailer frame having a fixed front bolster extending transversely and outboard thereof and a similar transversely mounted rear bolster which is attached to a floating frame having pivot means mounted within the intermediate portion of the main rectangular frame.

The floating rear bolster is connected by means of first and second main guide rails to the front bolster by pivots on the front bolster by each rail and novel sliding interconnections between the rails and the rear bolster. The rear bolster is connected to its pivot means by Y frames or the like which extend therefrom to the rear bolster and which support float means inboard of the rear support wheels of the main trailer frame.

The trailer also has a plurality of aligned keel rollers of the intersecting cone type mounted on the center line of the main frame portion of the trailer. The combined action of the pivoted Y frames and the pivoted and sliding connections on the main guide rails cooperate to provide a self leveling guide structure for the boat trailer which will receive a boat from the water over a wide latitude of angles of attack of the boar as it enters the trailer. The particular sliding guide structure in the guide means provides increased rigidity in the geometry of the guide structure in all of its positions of operation, rather afloat or bedded on the trailer.

DETAILED DESCRIPTION OF THE DRAWINGS

Figure 1:
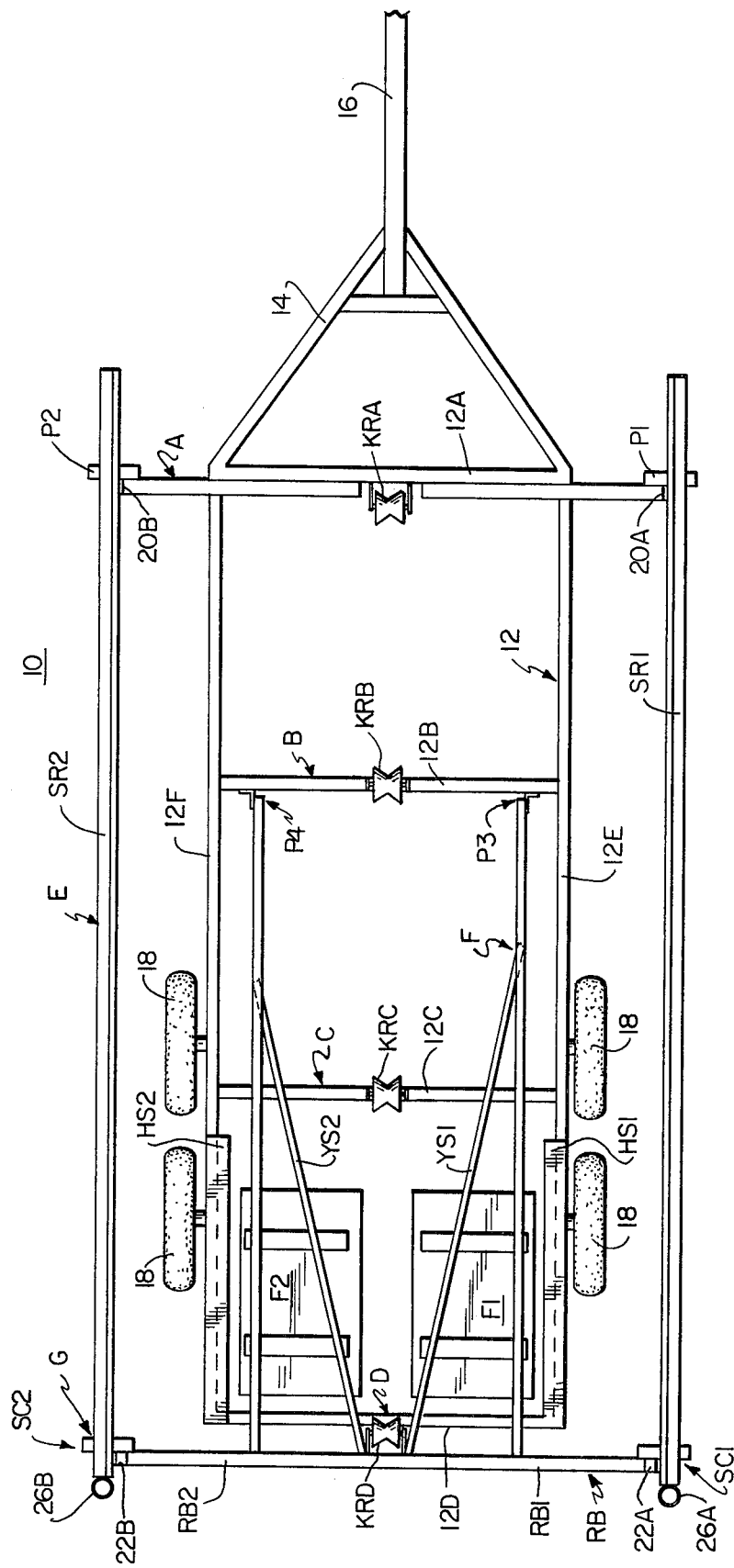
FIG. 1 is a top plan view of a boat trailer and launching and recovering guide structure of the present invention.
Figure 1A:
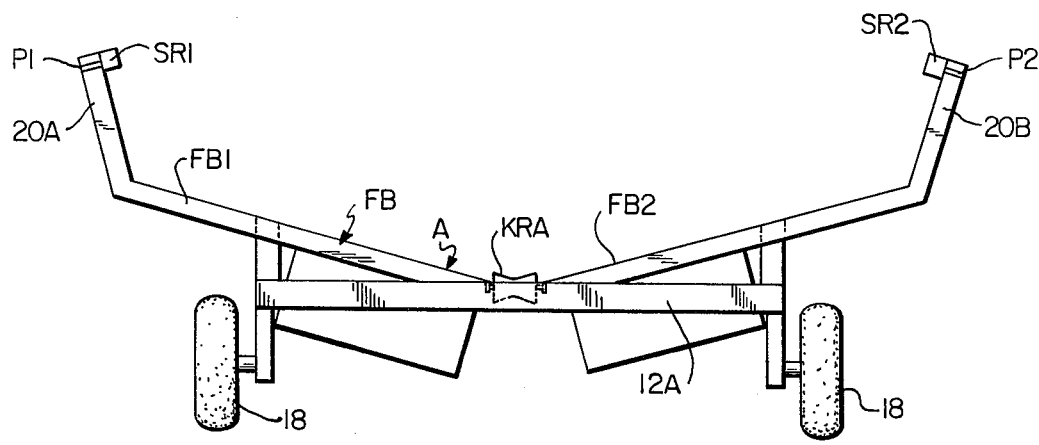
FIG. 1A is a front view of FIG. 1.
Figure 1B:
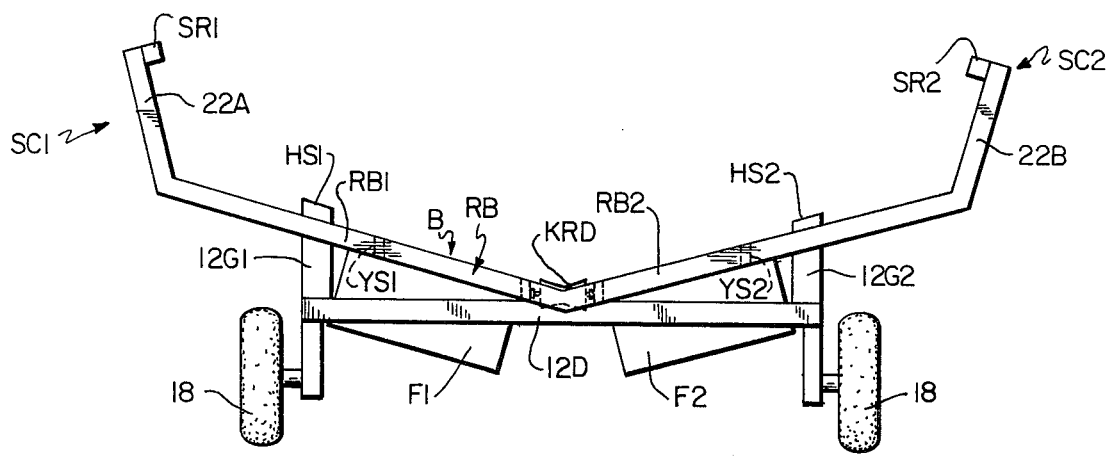
FIG. 1B is a rear view of FIG. 1.

Referring in detail to the drawings and with particular reference to FIG. 1, 1A and 1B the boat trailer of the present invention is shown as including a main rectangular section 12 drawn by a triangular front frame portion 14 and a draw bar 16 extending from the apex of the triangular front portion 14.

The rear of the main frame is provided with a plurality of wheels 18 in any suitable configuration depending upon the load to be placed upon the main frame 12 of the trailer 10.

For purposes of strength and rigidity proceeding from the front to the rear portion of the main frame 12, are provided four parallel cross beams 12A, 12B, 12C and 12D, respectively.

As shown in FIG. 1A, the front cross beam 12A mounts a front bolster assembly FB which is shaped in the configuration of the cross-section of a boat hull having angularly rising outriggers FB1 and FB2 joining to substantially vertically extending support arms 20A and 20B, respectively. At the top of the support arms are provided pivot members P1 and P2 which are transversely disposed with respect to the main frame 12 and parallel to the plane of the front bolster BF on which are pivoted first and second side rails SR1 and SR2 respectively.

The main guide rails SR1 and SR2 extend from the front bolster FB substantially parallel to the longitudinal side rails 12E and 12F of the main frame 12 to points of attachment SC1 and SC2, respectively, on a floating rear bolster RB having outrigger arms RB1 and RB2 in the shape of a boat hull with upstanding support arms 22A and 22B, respectively, attached to the outboard ends thereof.

The sliding couplings SC1 and SC2 will be described in more detail with reference to FIGS. 2, 3 and 4 herein and are only schematically illustrated in FIGS. 1 and 1B.

The main frame 12 supports the floating sub-frame portion FF of the boat launching and recovery frame, comprised of the subframe FF and the front and rear bolsters FB and RB and the guide rails SR1 and SR2, through a pair of pivot means P3 and P4 mounted adjacent the side rails 12E and 12F of the main frame 12 on the transverse beam 12B. The pivots P3 and P4 are respectively inboard of the side rails 12E and 12F of the main frame 12 and support the inboard ends of first and second Y-shaped struts YS1 and YS2 having the bifurcated portions or divergent arms of the Y-shapes connected to the rear bolster RB and the single portions thereof connected to the pivots P3 and P4.

Thus, as illustrated in FIGS. 1 and 1B a pair of floats F1 and F2 are mounted on the forked portion of the Y-shaped struts YS1 and YS2 on the float frame FF to effectuate the floating thereof vertically about the pivots P3 and P4.

The main frame assembly also includes first and second hull support rails HS1 and HS2 mounted, respectively, on the main side rails 12E and 12F of the main frame 12, substantially coextensively with the length of and adjacent to the floats F1 and F2 and extending upward on supports 12G1 and 12G2 (as best shown in FIG. 1B) which hull supporting rails HS1 and HS2 engage the hull of the boat within the trailer when the boat is in the lowest nested position possible on the trailer 10. This lowermost position of the boat on the trailer 10 is effectuated by the lowermost position of the floats F1 and F2 and the rear bolster RB which is constrained by the engagement of the Y-struts YS1 and YS2 at their inboard bifurcations with the rear cross beam 12D of the main frame 12. Since the Y-shaped struts YS1 and YS2 are welded to the outrigger arm portions RB1 and RB2 of the rear bolster RB, the apex of the bolster in rear view depends below the top line of the rear cross beam 12B.

In general operation, referring to FIGS. 5 and 6, when the trailer 10 is backed into a body of water such that the main frame 12 falls beneath the water line and the floats F1 and F2 raise the float from FF above the main frame 12 to a point at which the side rails SR1 and SR2 are parallel to the water line, the side rails SR1 can be seen to basically track at about the same level along the hull of the power boat PB in the nested position of FIG. 5 as in the floated position of FIG. 6.

In the position of FIG. 5, the hull of the power boat PB is resting on the hull support rails HS1 and HS2 and Y-struts YS1 and YS2 are lying substantially parallel to the side rails 12E and 12F of the main frame 12. In the floated position of FIG. 6, the forked struts YS1 and YS2 are pivoted upward about the pivots P3 and P4 such that they are extended from a point at the water line on the rear bolster RB to a point beneath the water line at the pivot P3 and P4 and the main frame 12.

Since the struts YS1 and YS2 change their relative orientation with respect to the guide rails SR1 and SR2 as well as to the main frame 12, and since the guide rails SR1 and SR2 are pivoted to the top of support arms 20A and 20B by the pivot P1 and P2 some compensation within this geometry must be made to preclude binding and at the same time provide sufficient rigidity for the power boat PB to enter the rear bolster RB at other than a coaxial orientation therewith.

If the power boat PB enters the rear bolster RB at some acute angle with reference to one of the guide rails SR1 or SR2 then the guide rails SR1 and SR2, if being mounted to the trailer with sufficient rigidity will constrain the power boat PB to right itself into a position such that the keel thereof will engage the keel rollers KRA, KRB, KRC and KRD on the cross beams 12A, 12B, 12C and rear bolsters RB respectively. These rollers KRA, KRB, KRC and KRD are best illustrated in FIGS. 1, 1A and 1B.

The outboard end of the main guide rails SR1, and SR2 are provided with guide-ons or protective vertically pivoted rollers 26A and 26B to protect the hull of the power boat PB from initial contact with the outboard end of the guide rails SR1 and SR2 as well as to provide a visual index for the pilot of the boat when attempting to load the boat onto the trailer.

In order to achieve this rigidity and in order that the variations in the geometry of the floating frame FF with respect to the guide rails SR1 and SR2 can properly take place, the new and novel sliding connections SC1 and SC2 of the present invention are essential. These connections will now be described with reference to FIGS. 2, 3 and 4.

The vertical support 22A for the guide rail SR1 is shown as being an L-shaped angle having a side flange 22A1 transversely oriented with respect to the length of the guide rail SR1 and another side flange 22A2 which is parallel to and immediately adjacent the guide rail SR1. A slide plate SP is illustrated as welded or otherwise integrally affixed at the top of the side flange 22A1 which is terminated beneath the main guide rail SR1 of the trailer 10 and affixed to the face of the side flange 22A2 which extends upward beyond the top of the guide rail SR1 and has a retainer or keeper bolt KB extending therethrough to preclude the guide rail SR1 and the sliding connection SC1 from demounting from the angle 22A as will be hereinafter more fully described.

A bearing plate BP is provided adjacent and parallel to and of a vertical dimension subtending a major portion of the main guide rail SR1. The bearing plate BP extends for a sufficient distance along the outboard side of the guide rail SR1 with its lowermost surface BP1 engaging in sliding juxtaposition, the upper surface of the slide plate SP. The bearing plate BP is fastened securely to the outside surface of the guide rail SR1 by means of first and second spacers SS1 and SS2 by means of keepers or rivets K1 and K2, respectively, to provide an elongated rectangular slot RS between the bearing plate BP and the guide rail SR1 such that the elongated portion of the side flange 22A2 of the vertical angle 22A can extend upward therethrough to the position where the keeper bolt KB overlaps both the guide rail SR1 and the bearing plate BP to preclude the assembly from lifting vertically off of the top of the vertical angle 22A.

It is be understood that the description of the sliding connection SC1 for the side rail SR1 and the vertical angle 22A is duplicated in kind on the exterior surface of the guide rail SR2 at its point of intersection with the vertical support 22B which is also a vertical angle of the identical configuration 22A but constructed as a mirror image thereof.

Figure 2:
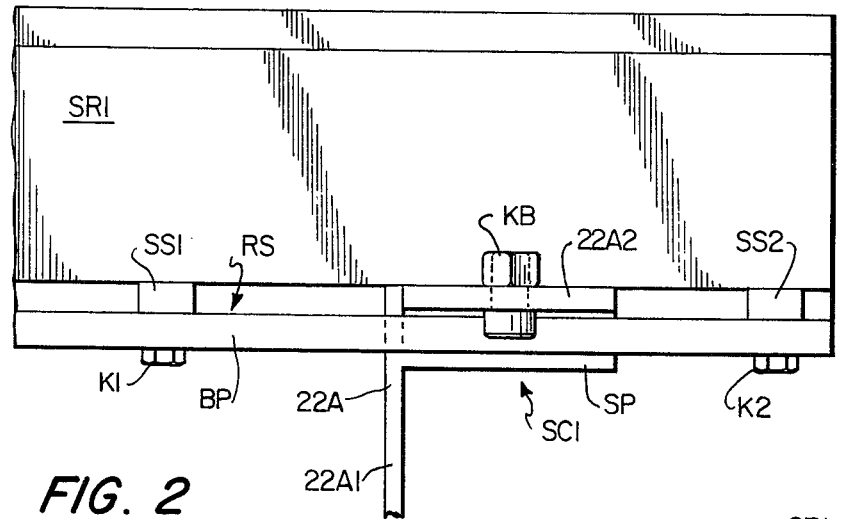
FIG. 2 is an enlarged detail of a guide rail and slide structure of the present invention in top plan view.
Figure 3:
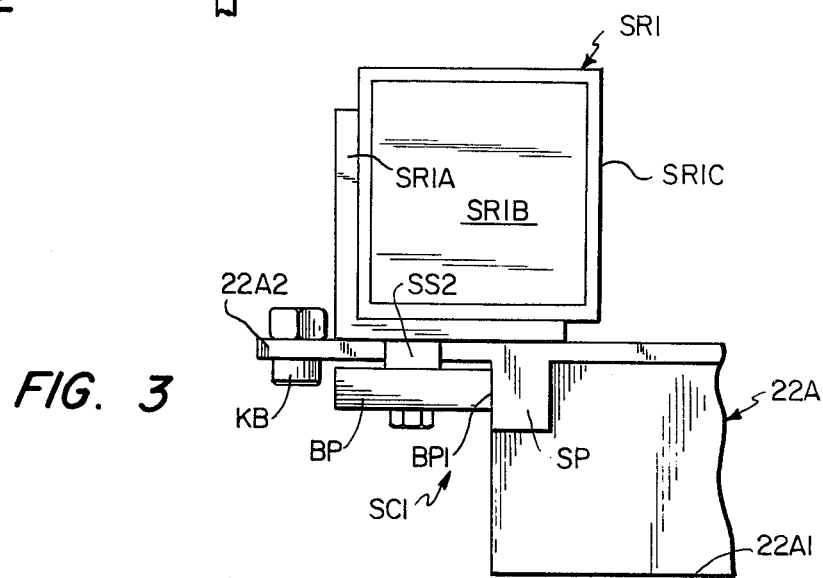
FIG. 3 is an end view of the enlarged detail of FIG. 2.
Figure 4:
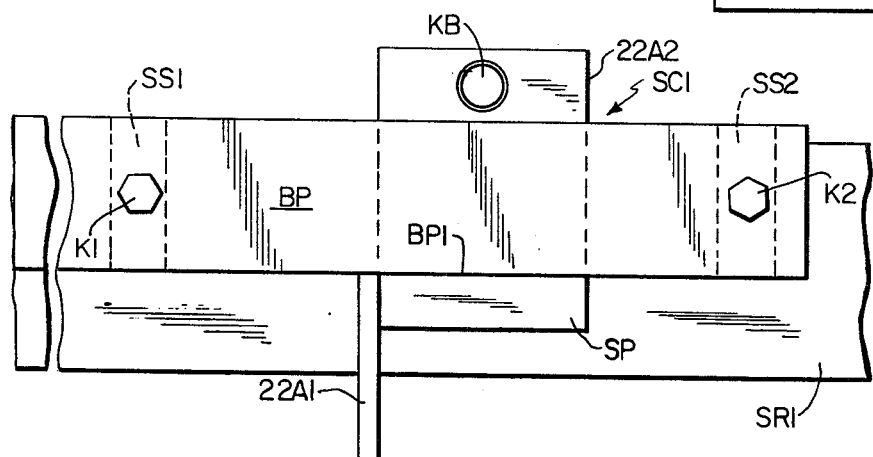
FIG. 4 is a side elevation of the enlarged detail of FIG. 2.

The guide rail construction is illustrated by the end view and the top view of the guide rail SR1 provided in FIGS. 2 and 3 which illustrate that the side rails are a composite structure including an angle iron SR1A into which is fitted two sides of a timber or wood core rail section SR1B the latter being completely faced in a felt material SR1C or like to prevent scratching of the hull of a boat as it is guided into the trailer by the side rails SR1 and SR2.

As shown in FIG. 5 when the boat is in its nested position and the float frame FF is in its lowermost position the guide-ons 26A extend a greater distance beyond the slide coupling SC1 on the guide rail SR1 than when the float frame FF is in its uppermost position at which time the guide-ons 26A are in their most proximate position to the slide coupling SC1. Therefore, it is graphically illustrated that the required change in geometry by the stronger structure of the present invention provided by the distance between the spacers SS1 and SS2 illustrated in FIGS. 2, 3 and 4 and that this distance between the spacers SS1 and SS2 can be changed if required to accommodate different water depths should the angle of the bottom of a body of water and the rate of increase of depth at a loading dock be greater than the maximum float height for the frame FF as determined by engagement of the web 22A2 with the outermost spacer SS1.

As can readily be seen the foregoing specification the present invention provides a strong frame structure which provides a wide latitude of approach angles for the loading and unloading of a power boat from a boat trailer and incorporates a relatively rigid structure of symmetrical geometry with regard to the pivot points thereof into a floating frame boat trailer by the use of a novel sliding coupling at the upper outer end of the elongated side rails which further enhance the desired characteristics of the present invention.

It should be understood that the Boat Launching and Recovery Guide for Boat Trailers of the present invention may be modified as would occur to one of ordinary skill in the art without departing from the spirit and scope of the present invention.

It is claimed:

1. In a boat launching and recovery trailer having a wheeled main frame for engaging the bottom of a body of water and a floating frame section for assuming the attitude of the surface relative to the main frame, the improvement comprising:
   a plurality of transverse integral cross-braces spaced from front to rear of said main frame;
   front bolster means transversely affixed to a forward cross-brace on the main frame of the trailer and having a contour conforming to the hull of a boat to be launched and recovered by the said trailer;
   a floating frame having first and second forward pivot means affixed by the latter to an intermediate one of said cross-braces and extending rearwardly to an integral rear bolster means transversely disposed at the rear end of said frame and having a main hull-shaped contour for recovering and launching a boat therethrough on and from said trailer;
   said floating frame including float means adjacent said rear bolster means;
   said front and rear bolster means each including upstanding arm portions on opposite sides of said main frame; and
   guide rail means interconnecting said front and rear bolster means for guiding a boat during launching and recovery thereof substantially the length of said main frame;
   said guide rail means comprising first and second parallel rails connecting corresponding ones of said upstanding arm portions of said front bolster to said rear bolster, first and second pivot means connecting said first and second guide rails at one end thereof to said front bolster and first and second sliding coupling means connecting said other ends of said first and second guide rails to said rear bolster to provide for longitudinal displacement of said rear bolster with respect to said guide rails in response to flotation of said floating frame relative to said main frame.

2. The invention of claim 1, wherein each said sliding coupling comprises:
   an L-shaped angle comprising a vertical support arm portion of said rear bolster, said angle including one side flange elongated above the other and oriented parallel to the axis of an adjacent guide rail;
   an integral bearing plate substantially perpendicular to both said side flanges and parallel to said guide rail;
   slide means mounted parallel to and on said guide rail, enveloping said elongated side flange and slidably juxtaposed with said bearing plate to slidably support said guide rail on said rear bolster.

3. The invention defined in claim 2, wherein said slide means further includes retaining means in said elongated side flange constraining said slide means between it and said bearing plate.

4. The invention defined in claim 2, wherein said slide means further includes first and second stop means for engaging opposite sides of said elongated side flange to define the limit of travel of said guide rails relative to said rear bolster.

5. The invention defined in claim 4, wherein said slide means further includes retaining means in said elongated side flange constraining said slide means between it and said bearing plate.

6. The invention defined in claim 1, wherein said guide rails each comprise an elongated L-shaped angle having a top web and an outboard web dependent therefrom;
   an elongated wood railing mounted in said angle and having exposed surfaces in board of said angles; and
   a protective covering on said wood rails to preclude damage to the hull of a boat engaging same during launching and recovery by said trailer.

7. The invention defined in claim 2, wherein said guide rails each comprise an elongated L-shaped angle having a top web and an outboard web dependent therefrom;
   an elongated wood railing mounted in said angle and having exposed surfaces in board of said angles;
   a protective covering on said wood rails to preclude damage to the hull of a boat engaging same during launching and recovery by said trailer; and
   wherein said slide means is affixed to said elongated angle of a corresponding one of said guide rails.

8. The invention defined in claim 7, wherein said slide means further includes retaining means in said elongated side flange constraining said slide means between it and said bearing plate.

9. The invention defined in claim 7, wherein said slide means further includes first and second stop means for engaging opposite sides of said elongated side flange to define the limit of travel of said guide rails relative to said rear bolster.

10. The invention defined in claim 9, wherein said slide means further includes retaining means in said elongated side flange constraining said slide means between it and said bearing plate.

* * * * *